United States Patent
Huang et al.

(10) Patent No.: US 12,402,768 B2
(45) Date of Patent: Sep. 2, 2025

(54) RECHARGE CONTROL METHOD, ROBOT AND COMPUTER-READABLE STORAGE MEDIUM

(71) Applicants: UBTECH ROBOTICS CORP LTD, Shenzhen (CN); Best Epoch Technology Co, LTD, Shenzhen (CN)

(72) Inventors: Gaobo Huang, Shenzhen (CN); Hua Zhang, Shenzhen (CN); Xiangbin Huang, Shenzhen (CN)

(73) Assignees: UBTECH ROBOTICS CORP LTD, Shenzhen (CN); BEST EPOCH TECHNOLOGY CO. LTD, Shenzhen (CN)

( * ) Notice: Subject to any disclaimer, the term of this patent is extended or adjusted under 35 U.S.C. 154(b) by 384 days.

(21) Appl. No.: 18/080,702

(22) Filed: Dec. 13, 2022

(65) Prior Publication Data

US 2023/0210334 A1 Jul. 6, 2023

(30) Foreign Application Priority Data

Dec. 31, 2021 (CN) .......................... 202111682861.9

(51) Int. Cl.
*A47L 11/40* (2006.01)
*G05D 1/00* (2024.01)

(52) U.S. Cl.
CPC ........ *A47L 11/4011* (2013.01); *G05D 1/0225* (2013.01); *G05D 1/0242* (2013.01); *A47L 2201/022* (2013.01); *A47L 2201/04* (2013.01)

(58) Field of Classification Search
CPC ........... A47L 11/4011; A47L 2201/022; A47L 2201/04; G05D 1/0225; G05D 1/0242
See application file for complete search history.

(56) References Cited

U.S. PATENT DOCUMENTS

| 2008/0065266 A1* | 3/2008 | Kim ..................... G05D 1/0242 901/1 |
| 2015/0289740 A1* | 10/2015 | Yan ..................... G05D 1/0242 701/2 |
| 2017/0147001 A1* | 5/2017 | Shen ....................... G05D 1/00 |
| 2019/0196490 A1 | 6/2019 | Xiong et al. |
| 2019/0302793 A1* | 10/2019 | Leech ................... G01S 7/4808 |
| 2023/0173695 A1* | 6/2023 | Rembisz ................. G01S 17/88 |

FOREIGN PATENT DOCUMENTS

CN 105242674 A 1/2016

* cited by examiner

*Primary Examiner* — Wade Miles
*Assistant Examiner* — Aaron G Cain

(57) ABSTRACT

A recharge control method includes: providing a robot comprising a body and four infrared carrier receivers, wherein a second and a third of the four infrared carrier receivers are mounted on a front of the body, and a first and a fourth of four infrared carrier receivers are mounted on left side and on a right side of the body; receiving, by one or more of the four infrared carrier receivers, infrared carrier emitted by a charging dock; determining an area where the robot is located, wherein the area is one of at least five areas around the charging dock that are determined based on receiving of the infrared carrier by different combinations of the four infrared carriers and based on not receiving of the infrared carrier by the infrared carriers; and controlling the robot to move to the charging dock according to a movement mode corresponding to the area.

20 Claims, 8 Drawing Sheets

RECHARGE CONTROL METHOD, ROBOT AND COMPUTER-READABLE STORAGE MEDIUM

CROSS REFERENCE TO RELATED APPLICATIONS

This application claims priority to Chinese Patent Application No. CN 202111682861.9, filed Dec. 31, 2021, which is hereby incorporated by reference herein as if set forth in its entirety.

BACKGROUND

1. Technical Field

The present disclosure generally relates to robots, and particularly to a recharge control method, a robot, and a computer-readable storage medium.

2. Description of Related Art

Many autonomous mobile robots (e.g., cleaning robots) generally have an automatic recharging function, which allows them to return to the charging dock for automatic charging when they are almost out of power. The infrared registration approach is employed by some cleaning robots for automatic recharging. Specifically, the infrared carrier emitted by the charging dock is used to help the cleaning robots to dock into the charging dock. However, some cleaning robots suffer from problems of slow docking speed and low docking success rate.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
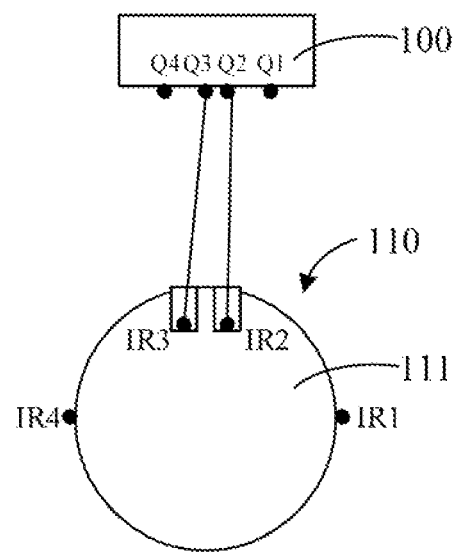
FIG. 1 is a schematic diagram of a system for implementing the recharge control method according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Many autonomous mobile robots (e.g., cleaning robots) generally have an automatic recharging function, which allows them to return to the charging dock for automatic charging when they are almost out of power. The infrared registration approach is employed by some cleaning robots for automatic recharging. Specifically, the infrared carrier emitted by the charging dock is used to help the cleaning robots to dock into the charging dock. However, some cleaning robots suffer from problems of slow docking speed and low docking success rate.

In order to solve the above-mentioned problems, some cleaning robots are equipped with a lidar that can be used to guide the robots to dock into a charging dock. However, for such cleaning robots, the charging docks is required to meet the requirements in height and shape, which is not conducive to widespread adoption.

In order to solve the above problems, embodiments of the present disclosure provide a recharging control method, robot, and computer-readable storage medium. The robot can be an autonomous mobile robot, such as a cleaning robot. The robot may include at least one infrared carrier receiver, and the corresponding charging dock may include at least four infrared carrier transmitters. The infrared carrier transmitters are to emit different infrared carriers to divide the area around the charging dock into at least five areas. When the robot needs to be recharged, the robot can receive the infrared carrier emitted by the infrared carrier transmitters of the charging dock through the at least one infrared carrier receiver, and determine the area where the robot is located according to the infrared carrier. Then, the robot can be controlled to move to the charging dock according to the movement mode corresponding to the area. That is, according to the embodiments of the present disclosure, the area where the robot is located can be accurately determined according to the infrared carrier received by infrared carrier receivers, so as to accurately control the robot to move to the charging dock for recharging according to the movement modes corresponding to different areas, which can improve the speed and success rate of robot recharging, thereby effectively improving user experience. Moreover, there is no special requirement for the size and shape of the charging dock, which can reduce the dependence on lidar, and increases the practicality and usability.

FIG. 1 shows a schematic diagram of the system implementing a recharging control method according to one embodiment. The system may include a charging dock 100 and a number of infrared carrier receivers arranged in a mobile robot 110 (e.g., an autonomous cleaning robot). The follow descriptions are made through an example in which four infrared carrier receivers are arranged in the mobile robot 110, and four infrared carrier transmitters are arranged in the charging dock 100. The four infrared carrier receivers are referred to as the first infrared carrier receiver IR1, the second infrared carrier receiver IR2, the third infrared carrier receiver IR3 and the fourth infrared carrier receiver IR4, respectively. The four infrared carrier transmitters are referred to as the first infrared carrier transmitter Q1, the second infrared carrier transmitter Q2, the third infrared carrier transmitter Q3 and the fourth infrared carrier transmitter Q4, respectively. The four infrared carrier transmitters are to transmit different infrared carriers, for example, different coded infrared carrier signals.

Figure 2:
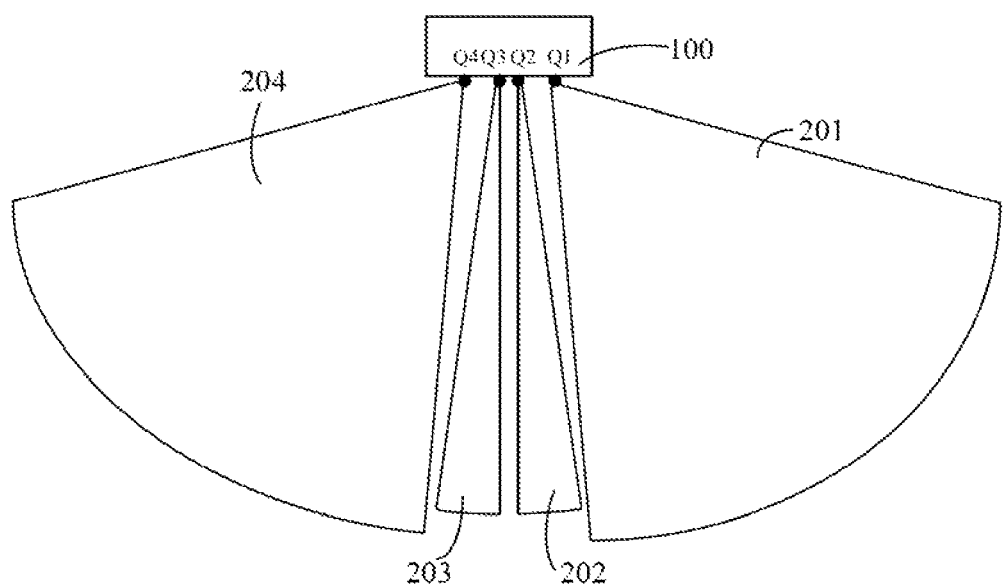
FIG. 2 is a schematic diagram of the carrier regions of the infrared transmitters according to one embodiment.

FIG. 2 shows a schematic diagram of different carrier regions of the infrared carrier transmitters according to one embodiment. In the embodiment as shown in FIG. 2, the four infrared carrier transmitters are arranged on the same planar surface of the charging dock 100. The second infrared carrier transmitter Q2 and the third infrared carrier transmitter Q3 are arranged between the first infrared carrier transmitter Q1 and the fourth infrared carrier transmitter Q4. The second infrared carrier transmitter Q2 and the third infrared carrier transmitter Q3 are to guide the robot 110 to move and dock into the charging dock 100. The carrier regions (i.e., sector 202) of the second infrared carrier transmitter Q2 and the carrier region (i.e., sector 203) of the third infrared carrier transmitter Q3 are in front of the charging dock 100 near a central axis that is perpendicular to the widthwise direction of the charging dock. The carrier regions of the second infrared carrier transmitter Q2 and the third infrared carrier transmitter Q3 are relatively narrow. The first infrared carrier transmitter Q1 and the fourth infrared carrier transmitter Q4 are to assist in finding the charging dock 100, and guide the robot 110 to move toward the central axis area of the charging dock 100. The carrier region (i.e., sector 201) of the first infrared carrier transmitter Q1 and the carrier region (i.e., sector 204) of the fourth infrared carrier transmitter Q4 are relatively large. When an infrared carrier receiver is in one of the above-mentioned carrier regions, the infrared carrier emitted by the infrared carrier transmitter corresponding to the one of the above-mentioned carrier regions can be received by the infrared carrier receiver. As shown in FIG. 2, the carrier region of the first/fourth infrared carrier transmitter is much larger than that of the second/third infrared carrier transmitter.

The specific coverage range of the carrier region of each infrared carrier transmitter can be set according to actual needs, which is not limited here.

In order to enable the robot 110 to efficiently and quickly move to the charging dock 100 for recharging, the area around the charging dock can be divided into at least five areas based on the carrier regions of the above-mentioned infrared carrier transmitters. In one embodiment, the at least five areas are seven in number, which include a first area, a second area, a third area, a fourth area, a fifth area, a sixth area, and a seventh area. The robot 110 can accurately and quickly move to the charging dock 100 for recharging according to the area where it is located.

In one embodiment, the first area is an area without infrared carrier. That is, when the robot is in the first area, the four infrared carrier receivers are not able to receive infrared carrier emitted by any of the infrared carrier transmitters of the charging dock.

In one embodiment, when the robot is in the second area, the four infrared carrier receivers are able to only receive infrared carrier emitted by the first infrared carrier transmitter Q1 of the charging dock.

In one embodiment, when the robot is in the third area, the second infrared carrier receiver IR2 and the third of the four infrared carrier receiver IR3 are able to only receive infrared carrier emitted by the second infrared carrier transmitter Q2 or the third infrared carrier transmitter Q3 of the charging dock.

In one embodiment, when the robot is in the fourth area, the second infrared carrier receiver IR2 is able to receive infrared carrier emitted by the second infrared carrier transmitter Q2, and the third infrared carrier receiver IR3 is able to receive infrared carrier emitted by the third infrared carrier transmitter Q3.

In one embodiment, when the robot is in the fifth area, the four infrared carrier receivers are able to only receive infrared carrier emitted by the fourth infrared carrier transmitter Q4 of the charging dock.

In one embodiment, when the robot is in the sixth area, a portion of the four infrared carrier receivers can only receive the infrared carrier emitted by the first infrared carrier transmitter Q1, while the rest of the four infrared carrier receivers cannot receive infrared carrier. Specifically, no matter what the pose of the robot 110 in the sixth area is, the four infrared carrier receivers cannot simultaneously receive the infrared carrier emitted by the first infrared carrier transmitter Q1.

In one embodiment, when the robot is in the seventh area, a portion of the four infrared carrier receivers can only receive the infrared carrier emitted by the fourth infrared carrier transmitter Q4, while the rest of the four infrared carrier receivers cannot receive infrared carrier. Specifically, no matter what the pose of the robot 110 in the fourth area is, the four infrared carrier receivers cannot simultaneously receive the infrared carrier emitted by the fourth infrared carrier transmitter Q4.

Figure 3:
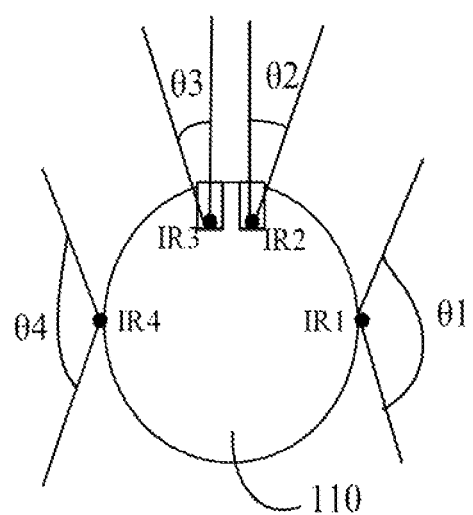
FIG. 3 is a schematic view of a robot according to one embodiment.

FIG. 3 shows a schematic diagram of the robot 110 according to one embodiment. The robot 110 is provided with a round body 111 and the first infrared carrier receiver IR1, the second infrared carrier receiver IR2, the third infrared carrier receiver IR3, and the fourth infrared carrier receiver IR4 that are mounted on the body 111. The second infrared carrier receiver IR2 and the third infrared carrier receiver IR3 are arranged on a front of the robot 110, which are used to accurately guide the robot 110 to move to the charging dock 100 for recharging. In one embodiment, the second infrared carrier receiver IR2 and the third infrared carrier receiver IR3 may be received in cavities defined in the front of the body 111. In one embodiment, the distance between the second infrared carrier receiver IR2 and the third infrared carrier receiver IR3 is very small (for example, less than or equal to 10 cm). Neither the receiving angle θ2 of the second infrared carrier receiver IR2 nor the receiving angle θ3 of the third infrared carrier receiver IR3 is large. For example, they can be less than 45 degrees. In addition, the most adjacent optical paths in the middle of the second infrared carrier receiver IR2 and the third infrared carrier receiver IR3 are approximately parallel to each other.

The first infrared carrier receiver IR1 and the fourth infrared carrier receiver IR4 are to assist in searching infrared carrier. Therefore, the first infrared carrier receiver IR1 and the fourth infrared carrier receiver IR4 are respectively arranged on opposite sides of the robot 110. For example, as shown in FIG. 3, the first infrared carrier receiver IR1 can be arranged on the right side of the body 111, and the fourth infrared carrier receiver IR4 can be arranged on the right side of the body 111. The receiving angle θ1 of the first infrared carrier receiver IR1 and the receiving angle θ4 of the fourth infrared carrier receiver IR4 are relatively large. For example, they can be greater than 150 degrees.

It should be noted that the receiving angle θ1 of the first infrared carrier receiver IR1, the receiving angle θ2 of the second infrared carrier receiver IR2, the receiving angle θ3 of the third infrared carrier receiver IR3 and the receiving angle θ4 of the fourth infrared carrier receiver IR4, and the distance between the second infrared carrier receiver IR2 and the third infrared carrier receiver IR3 can be set according to actual needs, which are not limited here.

Figure 4:
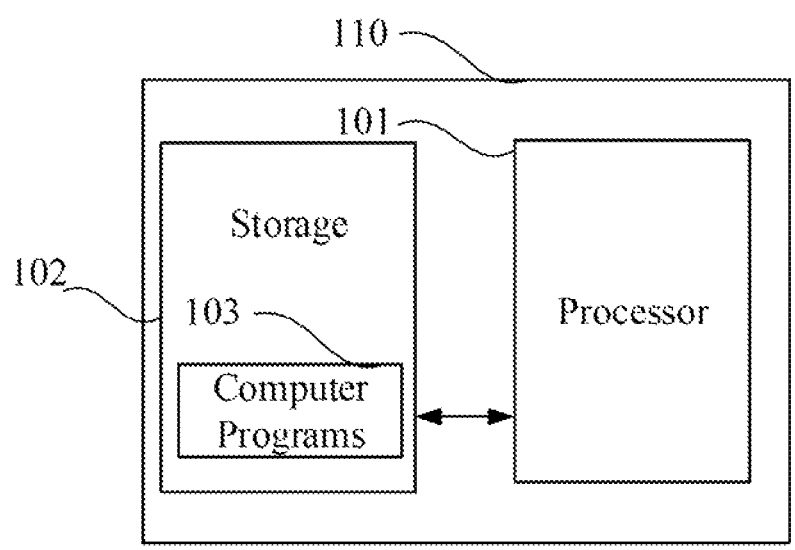
FIG. 4 is a schematic block diagram of a robot according to one embodiment.

FIG. 4 shows a schematic block diagram of the robot 110 according to one embodiment. The robot 110 may include a processor 101, a storage 102, and one or more executable computer programs 103 that are stored in the storage 102. The storage 102 and the processor 101 are directly or indirectly electrically connected to each other to realize data transmission or interaction. For example, the storage 102 and the processor 101 can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the robot 110, such as steps S401 to S404 in FIG. 4, are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot 110, such as a hard disk or a memory. The storage 102 may also be an external storage device of the robot 110, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot 110. The storage 102 can also be used to temporarily store data that have been output or is about to be output.

Figure 8:
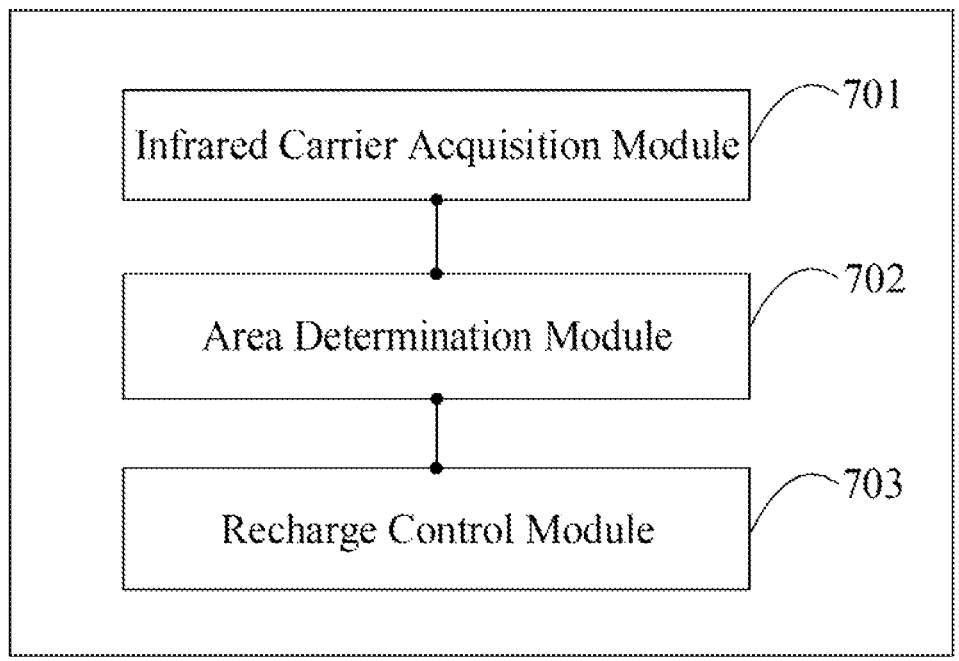
FIG. 8 is a schematic block diagram of a recharge control device applied in the robot.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 110. For example, the one or more computer programs 103 may be divided into an infrared carrier acquisition module 701, an area determination module 702, and a recharge control module 703 as shown in FIG. 8.

It should be noted that the block diagram shown in FIG. 4 is only an example of the robot 110. The robot 110 may include more or fewer components than what is shown in FIG. 4, or have a different configuration than what is shown in FIG. 4. Each component shown in FIG. 4 may be implemented in hardware, software, or a combination thereof.

Figure 5:
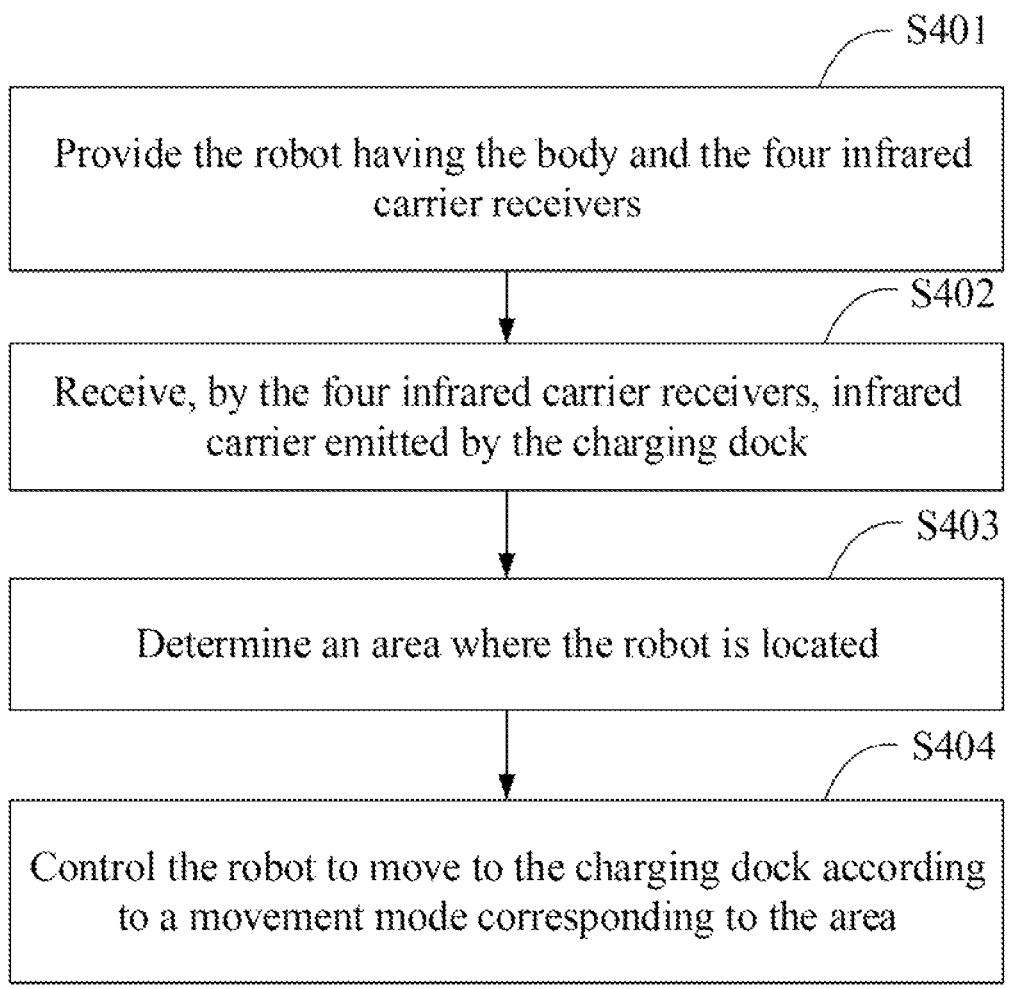
FIG. 5 is an exemplary flowchart of a recharge control method according to one embodiment.

FIG. 5 shows a flowchart of a recharge control method according to one embodiment. The method can be implemented by the system shown in FIG. 1. In one embodiment, the method may include the following steps.

Step S401: Provide the robot 110 having the body 111 and the four infrared carrier receivers.

Step S402: Receive, by the four infrared carrier receivers, infrared carrier emitted by the charging dock.

When the robot 110 detects that the battery power level is lower than a preset minimum power level, or receives a recharge instruction from a device (e.g., a mobile phone) corresponding to the robot 110, the robot 110 can rotate in situ and obtain infrared carrier emitted by the charging dock 100 using at least one infrared carrier receiver on the robot 110 during the rotation process. For example, the infrared carrier transmitted by the first infrared carrier transmitter Q1 on the charging dock 100 can be obtained through the first infrared carrier receiver IR1, or the infrared carrier transmitted by the second infrared carrier transmitter Q)2 on the charging dock 100 can be obtained through the second infrared carrier receiver IR2, and the infrared carrier transmitted by the third infrared carrier transmitter Q3 on the charging dock 100 can be obtained through the third infrared carrier receiver IR3.

In one example, in order to prevent the robot 110 from being interfered by other devices that can emit infrared carriers, thereby reducing the speed and success rate of the recharging of the robot 110, the infrared carrier emitted by the charging dock 100 that matches the robot 110 can be provided with identification features. Therefore, when the robot 110 acquires the infrared carrier, it can analyze the infrared carrier to determine whether the infrared carrier has a corresponding identification feature, thereby determining whether the infrared carrier is the infrared carrier emitted by the charging dock 100 matching the robot 110.

Step S403: Determine an area where the robot is located.

After the robot 110 acquires the infrared carrier emitted by the charging dock 100, it can analyze the acquired infrared carrier to determine which infrared carrier receivers of the robot 110 have received the infrared carrier, and determine which infrared carrier transmitters have emitted infrared carrier, thereby determining the area where the robot 110 is located. That is, it is determined which of the aforementioned seven areas the robot 110 is located in.

Figure 6:
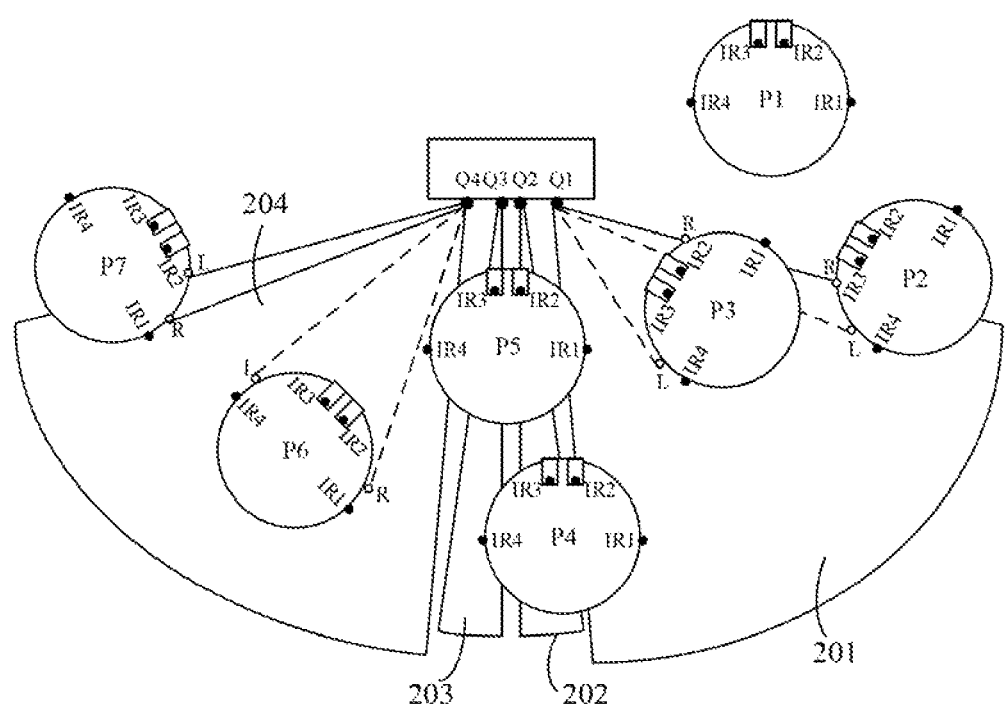
FIG. 6 is a schematic diagram showing the robot in different areas around the charging dock according to one embodiment.

FIG. 6 shows a schematic diagram of an application scenario according to one embodiment. When the center point of the robot 110 is at position P1, the first infrared carrier receiver IR1, the second infrared carrier receiver IR2, the third infrared carrier receiver IR3 and the fourth infrared carrier receiver IR4 in the robot 110 cannot receive the infrared carrier emitted by any of the first infrared carrier transmitter Q1, the second infrared carrier transmitter Q2, the third infrared carrier transmitter Q3 and the fourth infrared carrier transmitter Q4. In this case, the robot 110 can determine that the area where the robot 110 is currently located is the first area.

When the center point of the robot 110 is at position P2, by rotating the robot 110 in situ, a portion of the four infrared carrier receivers can only receive the infrared carrier emitted by the first infrared carrier transmitter Q1, while the rest of the four infrared carrier receivers cannot receive infrared carrier. In this case, the robot 110 may determine that the area where the robot 110 is currently located is the sixth area.

When the center point of the robot 110 is at position P3, by rotating the robot 110 in situ, the four infrared carrier receivers are able to only receive infrared carrier emitted by the first infrared carrier transmitter Q1 of the charging dock. In this case, the robot 110 may determine that the area where the robot 110 is currently located is the second area.

When the center point of the robot 110 is at position P4, by rotating the robot. 110 in situ, the second infrared carrier receiver IR2 and the third of the four infrared carrier receiver IR3 are able to only receive infrared carrier emitted by the second infrared carrier transmitter Q2 or the third infrared carrier transmitter Q3 of the charging dock. In this case, the robot 110 may determine that the area where the robot 110 is currently located is the third area.

When the center point of the robot 110 is at position P5, by rotating the robot 110 in situ, the second infrared carrier receiver IR2 is able to receive infrared carrier emitted by the second infrared carrier transmitter Q2, and the third infrared carrier receiver IR3 is able to receive infrared carrier emitted by the third infrared carrier transmitter Q3. In this case, the robot 110 may determine that the area where the robot 110 is currently located is the fourth area.

[0048] When the center point of the robot 110 is at position P6, by rotating the robot 110 in situ, the four infrared carrier receivers are able to only receive infrared carrier emitted by the fourth infrared carrier transmitter Q4 of the charging dock. In this case, the robot 110 may determine that the area where the robot 110 is currently located is the fifth area.

When the center point of the robot 110 is at position P7, by rotating the robot 110 in situ, a portion of the four infrared carrier receivers can only receive the infrared carrier emitted by the fourth infrared carrier transmitter Q4, while the rest of the four infrared carrier receivers cannot receive infrared carrier. In this case, the robot 110 may determine that the area where the robot 110 is currently located is the seventh area.

Step S404: Control the robot to move to the charging dock according to a movement mode corresponding to the area.

In one embodiment, when the robot is in the first area, since any infrared carrier receiver in the robot 110 cannot receive any infrared carrier, the robot 110 cannot determine the location of the charging dock 100. In this case, the robot 110 can directly indicate that the charging dock 100 cannot be detected.

In one embodiment, when the robot is in the sixth area, the robot 110 can be controlled to rotate in situ and stops rotation when the fourth infrared carrier receiver IR4 is at a first critical position. The first critical position is a limit position where the infrared carrier emitted by the first infrared carrier transmitter can be received. Exemplarily, as shown in FIG. 6, when the center point of the robot 110 is at position P2, the first critical position can be a lower critical position L or an upper critical position R. The critical position L is the lowermost point that is formed by the infrared light beam directed onto the robot, and the critical position R is the uppermost point that is formed by the infrared light beam directed onto the robot. When the center point of the robot 110 is at position P2, the fourth infrared carrier receiver IR4 shown in FIG. 6 is not able to receive the infrared carrier emitted by the first infrared carrier transmitter Q1. When the robot rotates in situ clockwise, the fourth infrared carrier receiver IR4 moves toward the critical position L, and is able to receive the infrared carrier emitted by the first infrared carrier transmitter Q1 after it moves to the critical position L.

After the robot 110 stops its rotation when the fourth infrared carrier receiver IR4 is at a first critical position, the robot 110 can rotate counterclockwise by a first preset angle, and can move forward after the rotation. The first preset angle may be set according to actual needs, which is not limited here. For example, the first preset angle may be 90 degrees. The first preset angle may equal to the angle between the line passing through the center point of the robot 110 and the first infrared carrier transmitter Q1 and the forward direction of the robot 110.

During the forward movement of the robot 110, the robot 110 can obtain the infrared carrier received by the first infrared carrier receiver IR1. When the infrared carrier received by the first infrared carrier receiver IR1 is the infrared carrier emitted by the third infrared carrier transmitter Q3, it means that the first infrared carrier receiver IR1 is in the carrier region of the third infrared carrier transmitter Q3. That is to say, the robot 110 has entered the central axis area of the charging dock 100. The robot 110 can then adjust the pose of the robot 110. For example, the robot 110 can be rotated so that the front of the robot 110 faces the second infrared carrier transmitter Q2 and the third infrared carrier transmitter Q3. After the pose adjustment, the robot 110 can then move towards the second infrared carrier transmitter Q2 and the third infrared carrier transmitter Q3. During the movement, the second infrared carrier receiver IR2 of the robot 110 can always receive the infrared carrier emitted by the second infrared carrier transmitter Q2, and the third infrared carrier receiver IR3 can always receive the infrared carrier emitted by the third infrared carrier transmitter Q3.

In one embodiment, after rotating counterclockwise by a first preset angle, the robot 110 can first move forward by a first distance. After moving forward by the first distance, the robot 110 can rotate clockwise. During the rotation process, the robot 110 can obtain the infrared carrier received by the third infrared carrier receiver IR3. When the third infrared carrier receiver IR3 starts to receive the infrared carrier from the first infrared carrier transmitter Q1, the robot110 stops rotating, and determines the rotation angle A of the robot 110. Here, the robot 110 may determine the rotation angle A through an inertial measurement unit (IMU) or an odometer.

Then, the robot 110 can determine the second distance between the robot 110 and the charging dock 100 according to the first distance and the angle A. The robot 110 then moves along a circle toward the central axis that is perpendicular to the widthwise direction of the charging dock. The center of the circle is located at the center point of the charging dock 100, and the radius of the circle equals to the second distance. During the circular motion of the robot 110, the robot 110 can obtain the infrared carrier received by the first infrared carrier receiver IR1. When the first infrared carrier receiver IR1 starts to receive the infrared carrier emitted by the third infrared carrier transmitter Q3, the robot 110 can stop the circular motion and adjust its pose. After that, the robot 110 moves towards the second infrared carrier transmitter Q2 and the third infrared carrier transmitter Q3. During the movement, the second infrared carrier receiver IR2 of the robot 110 can always receive the infrared carrier emitted by the second infrared carrier transmitter Q2, and the third infrared carrier receiver IR3 can always receive the infrared carrier emitted by the second infrared carrier transmitter Q3.

It should be noted that the first distance may be set by according to actual needs, which is not limited here. For example, the first distance may be set to 20 centimeters, 30 centimeters or 50 centimeters according to actual needs.

Figure 7:
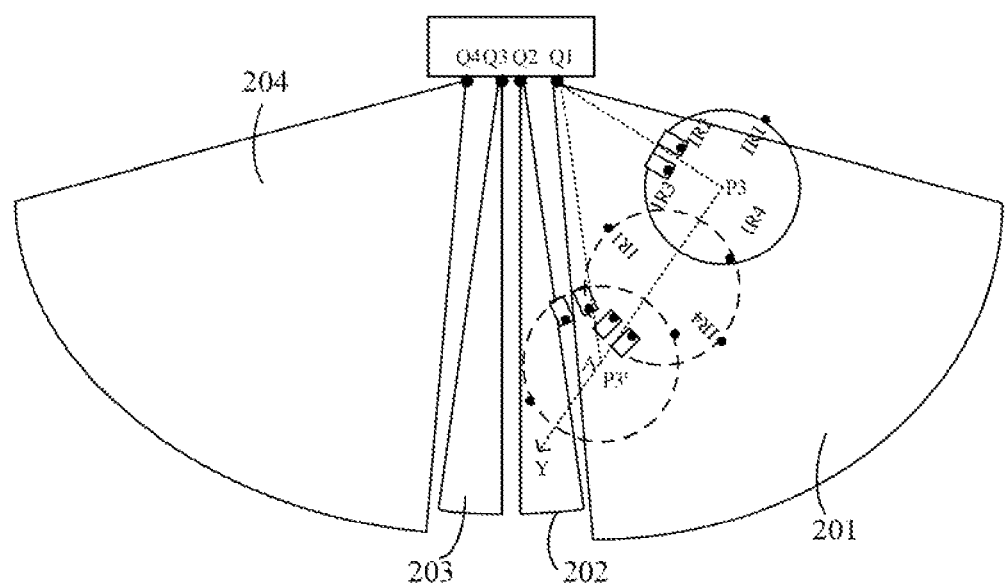
FIG. 7 is a schematic diagram showing an exemplary movement process of the robot.

FIG. 7 shows a schematic diagram of the movement of the robot according to one embodiment. As shown in FIG. 6, when the center point of the robot 110 is at the position P3, the robot 110 may first rotate counterclockwise by a first preset angle (e.g., 90 degrees). Then, the robot 110 may move forward a first distance (e.g., 20 centimeters).

When the robot 110 moves the first distance to reach the position P3', the robot 110 can rotate clockwise. During the rotation process, the robot 110 can obtain the infrared carrier received by the third infrared carrier receiver IR3. When the third infrared carrier receiver IR3 starts to receive the infrared carrier emitted by the first infrared carrier transmitter Q21, the robot 110 stops the rotation, and determine the rotation angle A (i.e., ≤QIP3'Y in FIG. 6) of the robot 110 by the IMU or the odometer. Then, the robot 110 can determine the second distance (i.e., Q1P3') between the robot 110 and the charging dock 100 according to the first distance (i.e., P3P3') and the angle A. That is, QIP3'=|first distance/cos (180°−A)| can be obtained through trigonometric functions.

When the robot is in the second area, the robot 110 can rotate in situ and stop when the third infrared carrier receiver IR3 is at a second critical position. The second critical position is a limit position where the infrared carrier emitted by the first infrared carrier transmitter can be received. Exemplarily, as shown in FIG. 6, when the center point of the robot 110 is at position P3, the second critical position can be a critical position L or a critical position R. The critical position L is the lowermost point that is formed by the infrared light beam directed onto the robot, and the critical position R is the uppermost point that is formed by the infrared light beam directed onto the robot. When the center point of the robot 110 is at position P3, the third infrared carrier receiver IR3 shown in FIG. 6 is able to receive the infrared carrier emitted by the first infrared carrier transmitter Q1. When the robot rotates in situ clockwise, the third infrared carrier receiver IR3 moves toward the critical position R, and is not able to receive the infrared carrier emitted by the first infrared carrier transmitter Q1 after it move past the critical position R.

After the robot 110 stops its rotation when the third infrared carrier receiver IR3 is at a second critical position, the robot 110 can rotate counterclockwise by a second preset angle, and can move forward after the rotation. Similar to the first preset angle, the second preset angle may be set according to actual needs, which is not limited here. For example, the second preset angle may be set to 90 degrees according to actual needs. The second preset angle may equal to the angle between the line passing through the center point of the robot 110 and the first infrared carrier transmitter Q1 and the forward direction of the robot 110.

During the forward movement of the robot 110, the robot 110 can obtain the infrared carrier received by the first infrared carrier receiver IR1. When the infrared carrier received by the first infrared carrier receiver IR1 is the infrared carrier transmitted by the third infrared carrier transmitter Q23, it means that the first infrared carrier receiver IR1 is in the carrier region of the third infrared carrier transmitter Q3. That is to say, the robot 110 has entered the central axis area of the charging dock 100. The robot 110 can adjust its pose, for example, by rotating in situ so that the front of the robot 110 faces the second infrared carrier transmitter Q2 and the third infrared carrier transmitter Q3. After the pose adjustment, the robot 110 can move towards the second infrared carrier transmitter Q2 and the third infrared carrier transmitter Q3. During the movement, the second infrared carrier receiver IR2 of the robot 110 can always receive the infrared carrier emitted by the second infrared carrier transmitter Q2, and the third infrared carrier receiver IR3 can always receive the infrared carrier emitted by the third infrared carrier transmitter Q3.

In an alternative embodiment, when the robot is in the second area, the robot 110 may move toward the charging dock 100 by first moving forward the first distance after rotating counterclockwise by the first preset angle. For details, reference may be made to relevant content when the robot is in the sixth area, which will not be repeated here. When the robot is in other areas, the 110 can move towards the charging dock 100 in the same manner.

When the robot is in the third area, it means that the robot 110 is already in a position in front of the charging dock 100 relatively close to the central axis area.

In one embodiment, when the second infrared carrier receiver IR2 and the third infrared carrier receiver IR3 can simultaneously receive the infrared carrier of the second infrared carrier transmitter Q2, the robot 110 can rotate in situ and stop when the second infrared carrier receiver IR2 or the third infrared carrier receiver IR3 is at a third critical position. The third critical position is a limit position where the infrared carrier emitted by the second infrared carrier transmitter can be received. Specifically, when the second infrared carrier receiver IR2 is on the left of and adjacent to the third critical position, the second infrared carrier receiver IR2 can receive the infrared carrier emitted by the second infrared carrier transmitter Q2. When the second infrared carrier receiver IR2 is on the right of the third critical position, the second infrared carrier receiver IR2 cannot receive the infrared carrier emitted by the second infrared carrier transmitter Q2. Similarly, when the third infrared carrier receiver IR3 is on the left of and adjacent to the third critical position, the third infrared carrier receiver IR3 can receive the infrared carrier emitted by the second infrared carrier transmitter Q2. When the third infrared carrier receiver IR3 is on the right of the third critical position, the third infrared carrier receiver IR3 cannot receive the infrared carrier emitted by the second infrared carrier transmitter Q2.

After the robot stops its rotation when the second infrared carrier receiver IR2 or the third infrared carrier receiver IR3 is at the third critical position, the robot 110 can rotate counterclockwise by a third preset angle, and can move forward after the rotation. Similar to the first preset angle and the second preset angle, the third preset angle may be set according to actual needs, which is not limited here. For example, the third preset angle may be set to 90 degrees according to actual needs. The third preset angle may equal to the angle between the line passing through the center point of the robot 110 and the second infrared carrier transmitter Q2 and the forward direction of the robot 110.

During the forward movement of the robot 110, the robot 110 can obtain the infrared carrier received by the first infrared carrier receiver IR1. When the infrared carrier received by the first infrared carrier receiver IR1 is the infrared carrier transmitted by the third infrared carrier transmitter Q3, it means that the robot 110 has entered the central axis area of the charging dock 100. The robot 110 can adjust its pose, for example, by rotating in situ so that the front of the robot 110 faces the second infrared carrier transmitter (22 and the third infrared carrier transmitter Q3. After the pose adjustment, the robot 110 can move towards the second infrared carrier transmitter Q2 and the third infrared carrier transmitter Q3. During the movement, the second infrared carrier receiver IR2 of the robot 110 can always receive the infrared carrier emitted by the second infrared carrier transmitter Q2.

In one embodiment, when the second infrared carrier receiver IR2 and the third infrared carrier receiver IR3 can simultaneously receive the infrared carrier of the third infrared carrier transmitter Q3, the robot 110 can rotate in situ and stop when the second infrared carrier receiver IR2 or the third infrared carrier receiver IR3 is at the fourth critical position. The fourth critical position critical position is a limit position where the infrared carrier emitted by the third infrared carrier transmitter can be received. Specifically, when the second infrared carrier receiver IR2 is on the left of and adjacent to the fourth critical position, the second infrared carrier receiver IR2 can receive the infrared carrier emitted by the third infrared carrier transmitter Q3. When the second infrared carrier receiver IR2 is on the right of the fourth critical position, the second infrared carrier receiver IR2 cannot receive the infrared carrier emitted by the third infrared carrier transmitter Q3. Similarly, when the third infrared carrier receiver IR3 is on the left of and adjacent to the fourth critical position, the third infrared carrier receiver IR3 can receive the infrared carrier emitted by the third infrared carrier transmitter Q3. When the third infrared carrier receiver IR3 is on the right of the fourth critical position, the third infrared carrier receiver IR3 cannot receive the infrared carrier emitted by the third infrared carrier transmitter Q3.

After the robot stops its rotation when the second infrared carrier receiver IR2 or the third infrared carrier receiver IR3 is at the fourth critical position, the robot 110 can rotate clockwise by a fourth preset angle, and can move forward after the rotation. Similar to the first preset angle, the second preset angle, and the third preset angle, the fourth preset angle may be set according to actual needs, which is not limited here. For example, the fourth preset angle may be set to 90 degrees according to actual needs. The fourth preset angle may equal to the angle passing through the line between the center point of the robot 110 and the second infrared carrier transmitter Q2 and the forward direction of the robot 110.

During the forward movement of the robot 110, the robot 110 can obtain the infrared carrier received by the fourth infrared carrier receiver IR4. When the infrared carrier received by the first infrared carrier receiver IR4 is the infrared carrier transmitted by the second infrared carrier transmitter Q2, it means that the robot 110 has entered the central axis area of the charging dock 100. The robot 110 can adjust its pose, for example, by rotating in situ so that the front of the robot 110 faces the second infrared carrier transmitter Q2 and the third infrared carrier transmitter Q3. After the pose adjustment, the robot 110 can move towards the second infrared carrier transmitter Q2 and the third infrared carrier transmitter Q3. During the movement, the second infrared carrier receiver IR2 of the robot 110 can always receive the infrared carrier emitted by the second infrared carrier transmitter Q2.

When the robot is in the fourth area, it means that the robot 110 is in the central axis area of the charging dock. The robot 110 can then adjust its pose. After the pose adjustment, the robot 110 can move toward the second infrared carrier transmitter Q2 and the third infrared carrier transmitter Q3.

When the robot 110 is in the fifth area, the movement mode of the robot 110 is similar to the movement mode of the robot in the second area. The two movement modes differ in the direction of rotation and the infrared carrier receivers to be observed. The two movement modes enable the robot 110 to move to the central axis area of the charging dock 100, and finally move to the charging dock 100 for recharging. Exemplarily, the robot 110 can rotate in situ and stop when the second infrared carrier receiver IR2 is at the fifth critical position. The fifth critical position is a position where the infrared carrier emitted by the fourth infrared carrier transmitter Q4 can be received. As shown in FIG. 6, when the center point of the robot 110 is at the position P6, the fifth critical position may be a critical position R. When the second infrared carrier receiver IR2 is above and adjacent to the fifth critical position, the second infrared carrier receiver IR2 can receive the infrared carrier emitted by the fourth infrared carrier transmitter Q4. When the second infrared carrier receiver IR2 is below the fifth critical position, the second infrared carrier receiver IR2 cannot receive the infrared carrier emitted by the fourth infrared carrier transmitter Q4.

After the robot stops its rotation when the second infrared carrier receiver IR2 is at the fifth critical position, the robot 110 can rotate clockwise by a fifth preset angle, and can move forward after the rotation. Similar to the first preset angle, the fifth preset angle may be set according to actual needs, which is not limited here. For example, the fourth preset angle may be set to 90 degrees according to actual needs. The fifth preset angle may equal to the angle passing through the line between the center point of the robot 110 and the fourth infrared carrier transmitter Q4 and the forward direction of the robot 110.

During the forward movement of the robot 110, the robot 110 can obtain the infrared carrier received by the fourth infrared carrier receiver IR4. When the infrared carrier received by the first infrared carrier receiver IR4 is the infrared carrier transmitted by the third infrared carrier transmitter Q3, it means that the robot 110 has entered the central axis area of the charging dock 100. The robot 110 can adjust its pose, for example, by rotating in situ so that the front of the robot 110 faces the second infrared carrier transmitter Q2 and the third infrared carrier transmitter Q3. After the pose adjustment, the robot 110 can move towards the second infrared carrier transmitter Q2 and the third infrared carrier transmitter Q3. During the movement, the second infrared carrier receiver IR2 of the robot 110 can always receive the infrared carrier emitted by the second infrared carrier transmitter ( ), and the third infrared carrier receiver IR3 of the robot 110 can always receive the infrared carrier emitted by the third infrared carrier transmitter Q3.

When the robot 110 is in the seventh area, the movement mode of the robot 110 is similar to the movement mode of the robot in the second area. The two movement modes differ in the direction of rotation and the infrared carrier receivers to be observed.

The two movement modes enable the robot 110 to move to the central axis area of the charging dock 100, and finally move to the charging dock 100 for recharging. Exemplarily, the robot 110 can rotate in situ and stop when the second infrared carrier receiver IR1 is at the sixth critical position. The sixth critical position is a position where the infrared carrier emitted by the fourth infrared carrier transmitter Q4 can be received. As shown in FIG. 6, when the center point of the robot 110 is at the position P7, the sixth critical position may be a critical position R. When the first infrared carrier receiver IR1 is above and adjacent to the sixth critical position, the first infrared carrier receiver IR1 can receive the infrared carrier emitted by the fourth infrared carrier transmitter Q4. When the first infrared carrier receiver IR1 is below the sixth critical position, the first infrared carrier receiver IR1 cannot receive the infrared carrier emitted by the fourth infrared carrier transmitter Q4.

After the robot stops its rotation when the first infrared carrier receiver IR1 is at the sixth critical position, the robot 110 can rotate clockwise by a sixth preset angle, and can move forward after the rotation. Similar to the first preset angle, the sixth preset angle may be set according to actual needs, which is not limited here. For example, the sixth preset angle may be set to 90 degrees according to actual needs. The sixth preset angle may equal to the angle passing through the line between the center point of the robot 110 and the fourth infrared carrier transmitter Q4 and the forward direction of the robot 110.

During the forward movement of the robot 110, the robot 110 can obtain the infrared carrier received by the fourth infrared carrier receiver IR4. When the infrared carrier received by the first infrared carrier receiver IR4 is the infrared carrier transmitted by the third infrared carrier transmitter Q3, it means that the robot 110 has entered the central axis area of the charging dock 100. The robot 110 can adjust its pose, for example, by rotating in situ so that the front of the robot 110 faces the second infrared carrier transmitter Q2 and the third infrared carrier transmitter Q3. After the pose adjustment, the robot 110 can move towards the second infrared carrier transmitter Q2 and the third infrared carrier transmitter Q3. During the movement, the second infrared carrier receiver IR2 of the robot 110 can always receive the infrared carrier emitted by the second infrared carrier transmitter Q2, and the third infrared carrier receiver IR3 of the robot 110 can always receive the infrared carrier emitted by the third infrared carrier transmitter Q3.

In summary, the robot of the above-mentioned embodiments may include at least one infrared carrier receiver, and the corresponding charging dock may include at least four infrared carrier transmitters. The infrared carrier transmitters are to emit different infrared carriers to divide the area around the charging dock into at least five areas. When the robot needs to be recharged, the robot can receive the infrared carrier emitted by the infrared carrier transmitters of the charging dock through the at least one infrared carrier receiver, and determine the area where the robot is located according to the infrared carrier. Then, the robot can be controlled to move to the charging dock according to the movement mode corresponding to the area. That is, according to the embodiments of the present disclosure, the area where the robot is located can be accurately determined according to the infrared carrier received by infrared carrier receivers, so as to accurately control the robot to move to the charging dock for recharging according to the movement modes corresponding to different areas, which can improve the speed and success rate of robot recharging, thereby effectively improving user experience. Moreover, there is no special requirement for the size and shape of the charging dock, which can reduce the dependence on lidar, and increases the practicality and usability.

It should be understood that sequence numbers of the foregoing processes do not mean an execution sequence in the embodiments of this disclosure. The execution sequence of the processes should be determined according to functions and internal logic of the processes, and should not be construed as any limitation on the implementation processes of this embodiment of this disclosure.

Referring to FIG. 8, in one embodiment, a recharge control device may be applied in the robot 110 that includes at least one infrared carrier receiver. The device may include an infrared carrier acquisition module 701, an area determination module 702, and a recharge control module 703. The infrared carrier acquisition module 701 is to receive, by the four infrared carrier receivers, infrared carrier emitted by a charging dock.

The area determination module 702 is to determine an area where the robot is located.

The area is one of at least five areas around the charging dock that are determined based on receiving of the infrared carrier by different combinations of the four infrared carriers and based on not receiving of the infrared carrier by the infrared carriers. The recharge control module 703 is to control the robot to move to the charging dock according to a movement mode corresponding to the area.

In one embodiment, the at least one infrared carrier receiver is four in umber.

The four infrared carrier receivers include a first infrared carrier receiver, a second infrared carrier receiver, a third infrared carrier receiver and a fourth infrared carrier receiver. The four infrared carrier transmitters are referred to as the first infrared carrier transmitter, the second infrared carrier transmitter, the third infrared carrier transmitter and the fourth infrared carrier transmitter, respectively. The at least five areas are seven in number, which include a first area, a second area, a third area, a fourth area, a fifth area, a sixth area, and a seventh area.

In one embodiment, the first area is an area without infrared carrier. That is, when the robot is in the first area, the four infrared carrier receivers are not able to receive infrared carrier emitted by any of the infrared carrier transmitters of the charging dock.

In one embodiment, when the robot is in the second area, the four infrared carrier receivers are able to only receive infrared carrier emitted by the first infrared carrier transmitter Q1 of the charging dock.

In one embodiment, when the robot is in the third area, the second infrared carrier receiver and the third of the four infrared carrier receiver are able to only receive infrared carrier emitted by the second infrared carrier transmitter or the third infrared carrier transmitter of the charging dock.

In one embodiment, when the robot is in the fourth area, the second infrared carrier receiver is able to receive infrared carrier emitted by the second infrared carrier transmitter, and the third infrared carrier receiver is able to receive infrared carrier emitted by the third infrared carrier transmitter.

In one embodiment, when the robot is in the fifth area, the four infrared carrier receivers are able to only receive infrared carrier emitted by the fourth infrared carrier transmitter of the charging dock.

In one embodiment, when the robot is in the sixth area, a portion of the four infrared carrier receivers can only receive the infrared carrier emitted by the first infrared carrier transmitter, while the rest of the four infrared carrier receivers cannot receive infrared carrier.

In one embodiment, when the robot is in the seventh area, a portion of the four infrared carrier receivers can only receive the infrared carrier emitted by the fourth infrared carrier transmitter, while the rest of the four infrared carrier receivers cannot receive infrared carrier.

In one embodiment, the recharge control module 703 is further configured to: when the robot is in the sixth area, control the robot to rotate such that the fourth infrared carrier receiver is at the first critical position where the fourth of the infrared carrier receivers is able to receive the infrared carrier emitted by the first infrared carrier transmitter; control the robot to rotate counterclockwise by a first preset angle, and control the robot to move forward; obtain the infrared carrier received by the first infrared carrier receiver; and in response to the infrared carrier received by the first infrared carrier receiver being the infrared carrier emitted by the third infrared carrier transmitter, adjust a pose of the robot, and control the robot to move toward the second infrared carrier transmitter and the third infrared carrier transmitter.

In one embodiment, the recharge control module 703 is further configured to: when the robot is in the second of the at least five areas, control the robot to rotate such that the third infrared carrier receiver is at a second critical position where the third infrared carrier receiver is able to receive the infrared carrier emitted by the first infrared carrier transmitter; control the robot to rotate counterclockwise by a second preset angle, and control the robot to move forward; obtain the infrared carrier received by the first infrared carrier receiver; and in response to the infrared carrier received by the first infrared carrier receiver being the infrared carrier emitted by the third infrared carrier transmitter, adjust a pose of the robot, and control the robot to move toward the second infrared carrier transmitter and the third infrared carrier transmitter.

In one embodiment, the recharge control module 703 is further configured to: when the robot is in the third area and the second and the third infrared carrier receivers only receive infrared carrier emitted by the second infrared carrier transmitter, control the robot to rotate such that the second infrared carrier receiver is at a third critical position where the infrared carrier emitted by the second infrared carrier transmitter can be received; control the robot to rotate counterclockwise by a third preset angle, and control the robot to move forward; obtain the infrared carrier received by the first infrared carrier receiver; and in response to the infrared carrier received by the first infrared carrier receiver being the infrared carrier emitted by the third infrared carrier transmitter, adjust a pose of the robot, and control the robot to move toward the second infrared carrier transmitter and the third infrared carrier transmitter.

In one embodiment, the recharge control module 703 is further configured to: when the robot is in the third area and the second and the third of the four infrared carrier receivers only receive infrared carrier emitted by the third infrared carrier transmitter, control the robot to rotate such that the second infrared carrier receiver is at a fourth critical position where the infrared carrier emitted by the third infrared carrier transmitter can be received; control the robot to rotate clockwise by a fourth preset angle, and control the robot to move forward; obtain the infrared carrier received by the fourth infrared carrier receiver; and in response to the infrared carrier received by the fourth infrared carrier receiver being the infrared carrier emitted by the second infrared carrier transmitter, adjust a pose of the robot, and control the robot to move toward the second infrared carrier transmitter and the third infrared carrier transmitter.

In one embodiment, the recharge control module 703 is further configured to: when the robot is in the fourth area, adjust a pose of the robot, and control the robot to move toward the second infrared carrier transmitter and the third infrared carrier transmitter.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative.

For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part, in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device) terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium.

Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make, equivalent substitutions on partial technical festures; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented recharge control method, comprising:

providing a robot comprising a body and four infrared carrier receivers, wherein a second and a third of the four infrared carrier receivers are mounted on a front of the body, and a first and a fourth of four infrared carrier receivers are mounted on left side and on a right side of the body, respectively, wherein receiving angles of the four infrared carrier receivers are non-overlapping, and the receiving angles of the second and the third of the four infrared carrier receivers are smaller than the receiving angles of the first and the fourth of the four infrared carrier receivers:

receiving, by one or more of the four infrared carrier receivers, infrared carrier emitted by a charging dock, wherein a plurality of infrared carrier transmitters are provided on the charging dock, and the infrared carrier transmitters comprise: a first infrared carrier transmitter, a second infrared carrier transmitter, a third infrared carrier transmitter and a fourth infrared carrier transmitter, wherein the second infrared carrier transmitter and the third infrared carrier transmitter are arranged between the first infrared carrier transmitter and the fourth infrared carrier transmitter, wherein carrier regions of the first infrared carrier transmitter and the fourth infrared carrier transmitter are larger than carrier regions of the second infrared carrier transmitter and the third infrared carrier transmitter, and wherein the carrier regions of the second infrared carrier transmitter and the third infrared carrier transmitter are in front of the charging dock near a central axis that is perpendicular to a widthwise direction of the charging dock;

determining an area where the robot is located, wherein the area is one of at least five areas around the charging dock that are determined based on receiving of the infrared carrier by different combinations of the four infrared carriers and based on not receiving of the infrared carrier by the infrared carriers; and controlling the robot to move to the charging dock according to a movement mode corresponding to the area.

2. The method of claim 1, wherein the carrier regions of the first infrared carrier transmitter, the second infrared carrier transmitter, the third infrared carrier transmitter and the fourth infrared carrier transmitter are non-overlapping;
wherein most adjacent optical paths of the second and third of the four infrared carrier receivers are approximately parallel to each other, and the at least five areas are seven in number; and
wherein when the robot is in a first of the at least five areas, the four infrared carriers receive no infrared carrier emitted by the charging dock;
when the robot is in a second of the at least five areas, the four infrared carrier receivers only receive infrared carrier emitted by the first infrared carrier transmitter of the charging dock;
when the robot is in a third of the at least five areas, the second and the third of the four infrared carrier receivers only receive infrared carrier emitted by the second infrared carrier transmitter or the third infrared carrier transmitter of the charging dock;
when the robot is in a fourth of the at least five areas, the second of the four infrared carrier receivers receives infrared carrier emitted by the second infrared carrier transmitter, and the third of the infrared carrier receivers receives infrared carrier emitted by the third infrared carrier transmitter;
when the robot is in a fifth of the at least five areas, the four infrared carrier receivers only receive infrared carrier emitted by the fourth infrared carrier transmitter of the charging dock;
when the robot is in a sixth of the at least five areas, a portion of the four infrared carrier receivers receives infrared carrier emitted by the first infrared carrier emitter, and at least one of the infrared carrier receivers receives no infrared carrier; and
when the robot is in a seventh of the at least five areas, a portion of the four infrared carrier receivers only receives infrared carrier emitted by the fourth infrared carrier transmitter, and rest of the four infrared carrier receivers receive no infrared carrier.

3. The method of claim 2, wherein controlling the robot to move to the charging dock according to the movement mode corresponding to the area comprises:
when the robot is in the sixth of the at least five areas, controlling the robot to rotate such that the fourth of the infrared carrier receivers is at a critical position where the infrared carrier emitted by the first infrared carrier transmitter can be received:
controlling the robot to rotate counterclockwise by a first preset angle, and controlling the robot to move forward:
obtaining the infrared carrier received by the first of the infrared carrier receivers; and
in response to the infrared carrier received by the first of the infrared carrier receivers being the infrared carrier emitted by the third infrared carrier transmitter, adjusting a pose of the robot, and controlling the robot to move toward the second infrared carrier transmitter and the third infrared carrier transmitter.

4. The method of claim 2, wherein controlling the robot to move to the charging dock according to the movement mode corresponding to the area comprises:
when the robot is in the second of the at least five areas, controlling the robot to rotate such that the third of the infrared carrier receivers is at a critical position where the infrared carrier emitted by the first infrared carrier transmitter can be received:
controlling the robot to rotate counterclockwise by a preset angle, and controlling the robot to move forward:
obtaining the infrared carrier received by the first of the infrared carrier receivers; and
in response to the infrared carrier received by the first of the infrared carrier receivers being the infrared carrier emitted by the third infrared carrier transmitter, adjusting a pose of the robot, and controlling the robot to move toward the second infrared carrier transmitter and the third infrared carrier transmitter.

5. The method of claim 2, wherein controlling the robot to move to the charging dock according to the movement mode corresponding to the area comprises:
when the robot is in the third of the at least five areas and the second and the third of the four infrared carrier receivers only receive infrared carrier emitted by the second infrared carrier transmitter, controlling the robot to rotate such that the second of the infrared carrier receivers is at a critical position where the infrared carrier emitted by the second infrared carrier transmitter can be received:
controlling the robot to rotate counterclockwise by a third preset angle, and controlling the robot to move forward:
obtaining the infrared carrier received by the first of the infrared carrier receivers; and
in response to the infrared carrier received by the first of the infrared carrier receivers being the infrared carrier emitted by the third infrared carrier transmitter, adjusting a pose of the robot, and controlling the robot to move toward the second infrared carrier transmitter and the third infrared carrier transmitter.

6. The method of claim 2, wherein controlling the robot to move to the charging dock according to the movement mode corresponding to the area comprises:
when the robot is in the third of the at least five areas and the second and the third of the four infrared carrier receivers only receive infrared carrier emitted by the third infrared carrier transmitter, controlling the robot to rotate such that the second of the infrared carrier receivers is at a critical position where the infrared carrier emitted by the third infrared carrier transmitter can be received:
controlling the robot to rotate clockwise by a preset angle, and controlling the robot to move forward:
obtaining the infrared carrier received by the fourth of the infrared carrier receivers; and
in response to the infrared carrier received by the fourth of the infrared carrier receivers being the infrared carrier emitted by the second infrared carrier transmitter, adjusting a pose of the robot, and controlling the robot to move toward the second infrared carrier transmitter and the third infrared carrier transmitter.

7. The method of claim 2, wherein controlling the robot to move to the charging dock according to the movement mode corresponding to the area comprises:
when the robot is in the fourth of the at least five areas, adjusting a pose of the robot, and controlling the robot to move toward the second infrared carrier transmitter and the third infrared carrier transmitter.

8. A robot comprising:
a body:
four infrared carrier receivers, wherein a second and a third of the four infrared carrier receivers are mounted on a front of the body, and a first and a fourth of four infrared carrier receivers are mounted on left side and on a right side of the body, respectively, wherein receiving angles of the four infrared carrier receivers are non-overlapping, and the receiving angles of the second and the third of the four infrared carrier receivers are smaller than the receiving angles of the first and the fourth of the four infrared carrier receivers:
one or more processors; and
a memory coupled to the one or more processors, the memory storing programs that, when executed by the one or more processors, cause performance of operations comprising:
receiving, by one or more of the four infrared carrier receivers, infrared carrier emitted by a charging dock, wherein a plurality of infrared carrier transmitters are provided on the charging dock, and the infrared carrier transmitters comprise: a first infrared carrier transmitter, a second infrared carrier transmitter, a third infrared carrier transmitter and a fourth infrared carrier transmitter, wherein the second infrared carrier transmitter and the third infrared carrier transmitter are arranged between the first infrared carrier transmitter and the fourth infrared carrier transmitter, wherein carrier regions of the first infrared carrier transmitter and the fourth infrared carrier transmitter are larger than carrier regions of the second infrared carrier transmitter and the third infrared carrier transmitter, and wherein the carrier regions of the second infrared carrier transmitter and the third infrared carrier transmitter are in front of the charging dock near a central axis that is perpendicular to a widthwise direction of the charging dock;
determining an area where the robot is located, wherein the area is one of at least five areas around the charging dock that are determined based on receiving of the infrared carrier by different combinations of the four infrared carriers and based on not receiving of the infrared carrier by the infrared carriers; and
controlling the robot to move to the charging dock according to a movement mode corresponding to the area.

9. The robot of claim 8, wherein when the robot is in a first of the at least five areas, the four infrared carriers receive no infrared carrier emitted by the charging dock:
when the robot is in a second of the at least five areas, the four infrared carrier receivers only receive infrared carrier emitted by the first infrared carrier transmitter of the charging dock;
when the robot is in a third of the at least five areas, the second and the third of the four infrared carrier receivers only receive infrared carrier emitted by the second infrared carrier transmitter or the third infrared carrier transmitter of the charging dock;
when the robot is in a fourth of the at least five areas, the second of the four infrared carrier receivers receives infrared carrier emitted by the second infrared carrier transmitter, and the third of the infrared carrier receivers receives infrared carrier emitted by the third infrared carrier transmitter; and
when the robot is in a fifth of the at least five areas, the four infrared carrier receivers only receive infrared carrier emitted by the fourth infrared carrier transmitter of the charging dock.

10. The robot of claim 9, wherein the at least five areas are seven in number, when the robot is in a sixth of the at least five areas, a portion of the four infrared carrier receivers receives infrared carrier emitted by the first infrared carrier emitter, and at least one of the infrared carrier receivers receives no infrared carrier: controlling the robot to move to the charging dock according to the movement mode corresponding to the area comprises:
when the robot is in the sixth of the at least five areas, controlling the robot to rotate such that the fourth of the infrared carrier receivers is at a critical position where the infrared carrier emitted by the first infrared carrier transmitter can be received:
controlling the robot to rotate counterclockwise by a first preset angle, and controlling the robot to move forward:
obtaining the infrared carrier received by the first of the infrared carrier receivers; and
in response to the infrared carrier received by the first of the infrared carrier receivers being the infrared carrier emitted by the third infrared carrier transmitter, adjusting a pose of the robot, and controlling the robot to move toward the second infrared carrier transmitter and the third infrared carrier transmitter.

11. The robot of claim 9, wherein controlling the robot to move to the charging dock according to the movement mode corresponding to the area comprises:
when the robot is in the second of the at least five areas, controlling the robot to rotate such that the third of the infrared carrier receivers is at a critical position where the infrared carrier emitted by the first infrared carrier transmitter can be received:
controlling the robot to rotate counterclockwise by a preset angle, and controlling the robot to move forward:
obtaining the infrared carrier received by the first of the infrared carrier receivers; and
in response to the infrared carrier received by the first of the infrared carrier receivers being the infrared carrier emitted by the third infrared carrier transmitter, adjusting a pose of the robot, and controlling the robot to move toward the second infrared carrier transmitter and the third infrared carrier transmitter.

12. The robot of claim 9, wherein controlling the robot to move to the charging dock according to the movement mode corresponding to the area comprises:
when the robot is in the third of the at least five areas and the second and the third of the four infrared carrier receivers only receive infrared carrier emitted by the second infrared carrier transmitter, controlling the robot to rotate such that the second of the infrared carrier receivers is at a critical position where the infrared carrier emitted by the second infrared carrier transmitter can be received:
controlling the robot to rotate counterclockwise by a third preset angle, and controlling the robot to move forward:
obtaining the infrared carrier received by the first of the infrared carrier receivers; and
in response to the infrared carrier received by the first of the infrared carrier receivers being the infrared carrier emitted by the third infrared carrier transmitter, adjusting a pose of the robot, and controlling the robot to move toward the second infrared carrier transmitter and the third infrared carrier transmitter.

13. The robot of claim 9, wherein controlling the robot to move to the charging dock according to the movement mode corresponding to the area comprises:
when the robot is in the third of the at least five areas and the second and the third of the four infrared carrier receivers only receive infrared carrier emitted by the third infrared carrier transmitter, controlling the robot to rotate such that the second of the infrared carrier receivers is at a critical position where the infrared carrier emitted by the third infrared carrier transmitter can be received:

controlling the robot to rotate clockwise by a preset angle, and controlling the robot to move forward:

obtaining the infrared carrier received by the fourth of the infrared carrier receivers; and in response to the infrared carrier received by the fourth of the infrared carrier receivers being the infrared carrier emitted by the second infrared carrier transmitter, adjusting a pose of the robot, and controlling the robot to move toward the second infrared carrier transmitter and the third infrared carrier transmitter.

14. The robot of claim 9, wherein controlling the robot to move to the charging dock according to the movement mode corresponding to the area comprises:

when the robot is in the fourth of the at least five areas, adjusting a pose of the robot, and controlling the robot to move toward the second infrared carrier transmitter and the third infrared carrier transmitter.

15. A non-transitory computer-readable storage medium storing instructions that, when executed by at least one processor of a robot comprising a body and four infrared carrier receivers, cause the at least one processor to perform a recharge control method, a second and a third of the four infrared carrier receivers mounted on a front of the body, and a first and a fourth of four infrared carrier receivers mounted on left side and on a right side of the body, the method comprising:

receiving, by one or more of the four infrared carrier receivers, infrared carrier emitted by a charging dock, wherein a plurality of infrared carrier transmitters are provided on the charging dock, and the infrared carrier transmitters comprise: a first infrared carrier transmitter, a second infrared carrier transmitter, a third infrared carrier transmitter and a fourth infrared carrier transmitter, wherein the second infrared carrier transmitter and the third infrared carrier transmitter are arranged between the first infrared carrier transmitter and the fourth infrared carrier transmitter, wherein carrier regions of the first infrared carrier transmitter and the fourth infrared carrier transmitter are larger than carrier regions of the second infrared carrier transmitter and the third infrared carrier transmitter, and wherein the carrier regions of the second infrared carrier transmitter and the third infrared carrier transmitter are in front of the charging dock near a central axis that is perpendicular to a widthwise direction of the charging dock;

determining an area where the robot is located, wherein the area is one of at least five areas around the charging dock that are determined based on receiving of the infrared carrier by different combinations of the four infrared carriers and based on not receiving of the infrared carrier by the infrared carriers; and controlling the robot to move to the charging dock according to a movement mode corresponding to the area:

wherein receiving angles of the four infrared carrier receivers are non-overlapping, and the receiving angles of the second and the third of the four infrared carrier receivers are smaller than the receiving angles of the first and the fourth of the four infrared carrier receivers.

16. The non-transitory computer-readable storage medium of claim 15, wherein when the robot is in a first of the at least five areas, the four infrared carriers receive no infrared carrier emitted by the charging dock;

when the robot is in a second of the at least five areas, the four infrared carrier receivers only receive infrared carrier emitted by the first infrared carrier transmitter of the charging dock;

when the robot is in a third of the at least five areas, the second and the third of the four infrared carrier receivers only receive infrared carrier emitted by the second infrared carrier transmitter or the third infrared carrier transmitter of the charging dock;

when the robot is in a fourth of the at least five areas, the second of the four infrared carrier receivers receives infrared carrier emitted by the second infrared carrier transmitter, and the third of the infrared carrier receivers receives infrared carrier emitted by the third infrared carrier transmitter; and when the robot is in a fifth of the at least five areas, the four infrared carrier receivers only receive infrared carrier emitted by the fourth infrared carrier transmitter of the charging dock.

17. The non-transitory computer-readable storage medium of claim 16, wherein the at least five areas are seven in number, when the robot is in a sixth of the at least five areas, a portion of the four infrared carrier receivers receives infrared carrier emitted by the first infrared carrier emitter, and at least one of the infrared carrier receivers receives no infrared carrier; controlling the robot to move to the charging dock according to the movement mode corresponding to the area comprises:

when the robot is in the sixth of the at least five areas, controlling the robot to rotate such that the fourth of the infrared carrier receivers is at a critical position where the infrared carrier emitted by the first infrared carrier transmitter can be received:

controlling the robot to rotate counterclockwise by a preset angle, and controlling the robot to move forward:

obtaining the infrared carrier received by the first of the infrared carrier receivers; and in response to the infrared carrier received by the first of the infrared carrier receivers being the infrared carrier emitted by the third infrared carrier transmitter, adjusting a pose of the robot, and controlling the robot to move toward the second infrared carrier transmitter and the third infrared carrier transmitter.

18. The non-transitory computer-readable storage medium of claim 16, wherein controlling the robot to move to the charging dock according to the movement mode corresponding to the area comprises:

when the robot is in the second of the at least five areas, controlling the robot to rotate such that the third of the infrared carrier receivers is at a critical position where the infrared carrier emitted by the first infrared carrier transmitter can be received:

controlling the robot to rotate counterclockwise by a preset angle, and controlling the robot to move forward:

obtaining the infrared carrier received by the first of the infrared carrier receivers; and in response to the infrared carrier received by the first of the infrared carrier receivers being the infrared carrier emitted by the third infrared carrier transmitter, adjusting a pose of the robot, and controlling the robot to move toward the second infrared carrier transmitter and the third infrared carrier transmitter.

19. The non-transitory computer-readable storage medium of claim 16, wherein controlling the robot to move to the charging dock according to the movement mode corresponding to the area comprises:
- when the robot is in the third of the at least five areas and the second and the third of the four infrared carrier receivers only receive infrared carrier emitted by the second infrared carrier transmitter, controlling the robot to rotate such that the second of the infrared carrier receivers is at a critical position where the infrared carrier emitted by the second infrared carrier transmitter can be received;
- controlling the robot to rotate counterclockwise by a preset angle, and controlling the robot to move forward:
- obtaining the infrared carrier received by the first of the infrared carrier receivers; and
- in response to the infrared carrier received by the first of the infrared carrier receivers being the infrared carrier emitted by the third infrared carrier transmitter, adjusting a pose of the robot, and controlling the robot to move toward the second infrared carrier transmitter and the third infrared carrier transmitter.

20. The non-transitory computer-readable storage medium of claim 16, wherein controlling the robot to move to the charging dock according to the movement mode corresponding to the area comprises:
- when the robot is in the third of the at least five areas and the second and the third of the four infrared carrier receivers only receive infrared carrier emitted by the third infrared carrier transmitter, controlling the robot to rotate such that the second of the infrared carrier receivers is at a critical position where the infrared carrier emitted by the third infrared carrier transmitter can be received;
- controlling the robot to rotate clockwise by a preset angle, and controlling the robot to move forward;
- obtaining the infrared carrier received by the fourth of the infrared carrier receivers; and
- in response to the infrared carrier received by the fourth of the infrared carrier receivers being the infrared carrier emitted by the second infrared carrier transmitter, adjusting a pose of the robot, and controlling the robot to move toward the second infrared carrier transmitter and the third infrared carrier transmitter.

\* \* \* \* \*